(12) United States Patent
Perotti

(10) Patent No.: US 12,077,116 B2
(45) Date of Patent: Sep. 3, 2024

(54) EXPANDABLE BUMPER CARGO CARRYING SYSTEM

(71) Applicant: Etrailer Corporation, Wentzville, MO (US)

(72) Inventor: Daniel Perotti, St. Charles, MO (US)

(73) Assignee: Etrailer Corporation, Wentzville, MO (US)

( * ) Notice: Subject to any disclaimer, the term of this patent is extended or adjusted under 35 U.S.C. 154(b) by 303 days.

(21) Appl. No.: 17/687,994

(22) Filed: Mar. 7, 2022

(65) Prior Publication Data
US 2022/0379829 A1  Dec. 1, 2022

Related U.S. Application Data

(60) Provisional application No. 63/193,429, filed on May 26, 2021.

(51) Int. Cl.
*B60R 9/06* (2006.01)
*B60R 19/48* (2006.01)

(52) U.S. Cl.
CPC .................................. *B60R 19/48* (2013.01)

(58) Field of Classification Search
CPC ............ B60R 9/06; B60R 9/045; B60R 19/48
USPC ......... 224/489, 491, 504–506, 512, 514–515
See application file for complete search history.

(56) References Cited

U.S. PATENT DOCUMENTS

| | | | | |
|---|---|---|---|---|
| 1,420,855 A * | 6/1922 | Lyon | ..................... | B60R 19/285 293/144 |
| 1,506,274 A * | 8/1924 | Specht | .................... | B60R 21/34 224/489 |
| 1,602,176 A * | 10/1926 | Specht | ................. | B60R 19/023 224/489 |
| 2,062,156 A * | 11/1936 | Zerbst | .................. | B60R 13/105 224/490 |
| 2,674,141 A * | 4/1954 | Cowan | ...................... | B67B 7/16 81/3.27 |
| 3,448,904 A * | 6/1969 | Sahr | ....................... | B60N 3/001 414/466 |
| 5,775,560 A * | 7/1998 | Zahn | ........................ | B60R 9/06 224/524 |
| 6,390,343 B1 * | 5/2002 | Jain | .......................... | B60R 9/06 224/524 |
| 2013/0264367 A1 * | 10/2013 | Hill | ........................... | B60R 9/10 224/505 |

* cited by examiner

*Primary Examiner* — Adam J Waggenspack
(74) *Attorney, Agent, or Firm* — Sandberg Phoenix & von Gontard, P.C.

(57) ABSTRACT

An expandable bumper cargo carrying system is removably attachable to a rear bumper of a vehicle and does not require that the vehicle have a trailer hitch receptacle at the rear end of the vehicle to attach the cargo carrying system to the vehicle. The cargo carrying system comprises a cargo basket that can pivot downward to a first, horizontally oriented operative position for supporting cargo on the cargo basket, and can pivot upward to a second, vertically oriented stored position when the cargo basket is not in use. The cargo basket defines a cargo support surface that is adjustable between a first longitudinal dimension of the cargo support surface and a second longitudinal dimension of the cargo support surface, where the second longitudinal dimension is larger than the first longitudinal dimension.

20 Claims, 11 Drawing Sheets

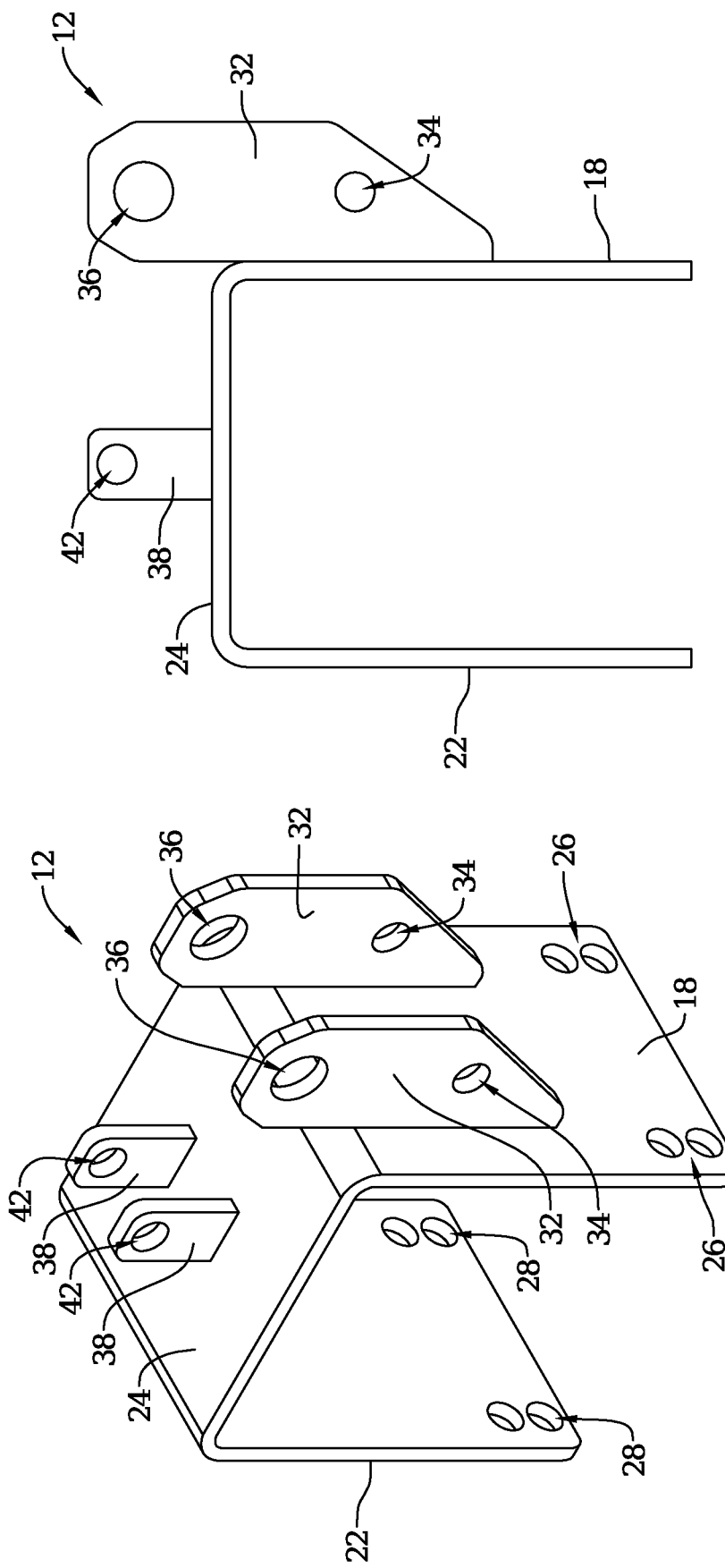

EXPANDABLE BUMPER CARGO CARRYING SYSTEM

CROSS-REFERENCE TO RELATED APPLICATIONS

This patent application claims the benefit of the filing date of provisional patent application No. 63/193,429, which was filed on May 26, 2021.

STATEMENT REGARDING FEDERALLY SPONSORED RESEARCH OR DEVELOPMENT

Not Applicable.

CROSS-REFERENCE TO RELATED APPLICATIONS

This patent application claims the benefit of the filing date of provisional patent application No. 63/193,429, which was filed on May 26, 2021.

STATEMENT REGARDING FEDERALLY SPONSORED RESEARCH OR DEVELOPMENT

Not Applicable.

BACKGROUND

There are many different types of cargo carrying systems that are attachable to a vehicle. Many are attachable to a rear end of a vehicle. Many of this type of cargo carrying system require that the vehicle have a trailer hitch receptacle secured to the frame of the vehicle at the rear of the vehicle. This type of cargo carrying system is removably attachable to the trailer hitch receptacle.

However, there are many types of vehicles that are manufactured without a trailer hitch receptacle at the rear of the vehicle. A cargo carrying system that is attachable to a trailer hitch receptacle is not capable of being used with a vehicle that does not include a trailer hitch receptacle.

BRIEF SUMMARY

This disclosure pertains to a cargo carrying system that is attachable to a vehicle. More specifically, this disclosure pertains to an expandable bumper cargo carrying system that is removably attachable to a rear bumper of a vehicle and does not require that the vehicle have a trailer hitch receptacle at the rear of the vehicle. Furthermore, the cargo carrying system is designed to pivot downward to a horizontally oriented operative position and to pivot upward to a vertically oriented stored position.

The expandable bumper cargo carrying system includes at least a pair of mounting brackets that can be removably attached to a rear bumper of a vehicle. This enables the expandable bumper cargo carrying system to be used on a vehicle that does have or does not have a trailer hitch receptacle.

Each mounting bracket is comprised of a front panel, a rear panel and a top panel that are integrally formed in an inverted U-shaped configuration. The configuration of the mounting bracket is resiliently flexible. The front panel and the rear panel can be flexed away from each other when positioning the mounting bracket over the bumper. The front panel and the rear panel can flex back toward each other with the front panel engaging against the bumper and the rear panel engaging against the bumper to thereby attach the mounting bracket to the bumper. The mounting bracket is attachable to the bumper without making any changes to the construction of the bumper such as drilling fastener holes through the bumper or any other such changes or modifications to the bumper.

An arm assembly is attached to each mounting bracket by a pivot connection. The pivot connection enables the arm assembly to pivot between a first or down, operative position of the arm assembly relative to the bracket and a second or up, stored position of the arm assembly relative to the bracket.

The expandable bumper cargo carrying system is also comprised of a cargo basket with a cargo support surface. The cargo support surface is adjustable between a first length dimension across the cargo support surface and a second length dimension across the cargo support surface where the second length dimension is larger than the first length dimension.

The cargo basket is secured to the arm assemblies by fasteners, by welding or by any other equivalent means. The arm assemblies connect the cargo basket to the pair of mounting brackets. The arm assemblies pivotally connect the cargo basket to the mounting brackets with the cargo support surface of the cargo basket being pivotable between the first and second positions of the cargo support surface relative to the mounting brackets. In the first position the cargo support surface is oriented horizontally and is positioned adjacent sides of the pair of mounting brackets. In the second position the cargo support surface is oriented vertically and is positioned directly, vertically above the tops of the mounting brackets.

The cargo basket and the cargo support surface are comprised of a first side section and a second side section that are removably attachable together. The first side section and the second side section of the cargo support surface provide the cargo support surface with a first length dimension across the first side section and the second side section.

The cargo basket and the cargo support surface also comprise a center section. The center section of the cargo support surface is removably attachable between the first side section and the second side section of the cargo support surface. The center section attached between the first side section and the second side section provides the cargo support surface with a second length dimension across the first side section, the center section and the second side section. The second length dimension of the cargo support surface is larger than the first length dimension of the cargo support surface.

A first mounting bracket of the pair of mounting brackets is pivotally connected by a first of the support arms to the first side section of the cargo support surface. A second mounting bracket of the pair of mounting brackets is pivotally connected by a second of the support arms to the second side section of the cargo support surface. The first mounting bracket and the second mounting bracket are removably attachable to a bumper of the vehicle with the cargo support surface having the first length dimension across the cargo support surface. The first mounting bracket and the second mounting bracket are also removably attachable to the bumper of a vehicle with the cargo support surface having the second length dimension across the cargo support surface.

The features, functions, and advantages of the expandable bumper cargo carrying system that have been discussed can be achieved independently in various embodiments or may be combined in yet other embodiments, further details of which can be seen with reference to the following description and drawings.

BRIEF DESCRIPTION OF THE DRAWINGS

Further features of the expandable bumper cargo carrying system are set forth in the following detailed description and drawing figures.

FIG. 2 is a perspective view of one of the pair of mounting brackets of the cargo carrying system.

FIG. 3 is a side elevation view of the bracket of FIG. 2.

Corresponding reference numerals will be used throughout the several figures of the drawings.

DETAILED DESCRIPTION

Figure 1:
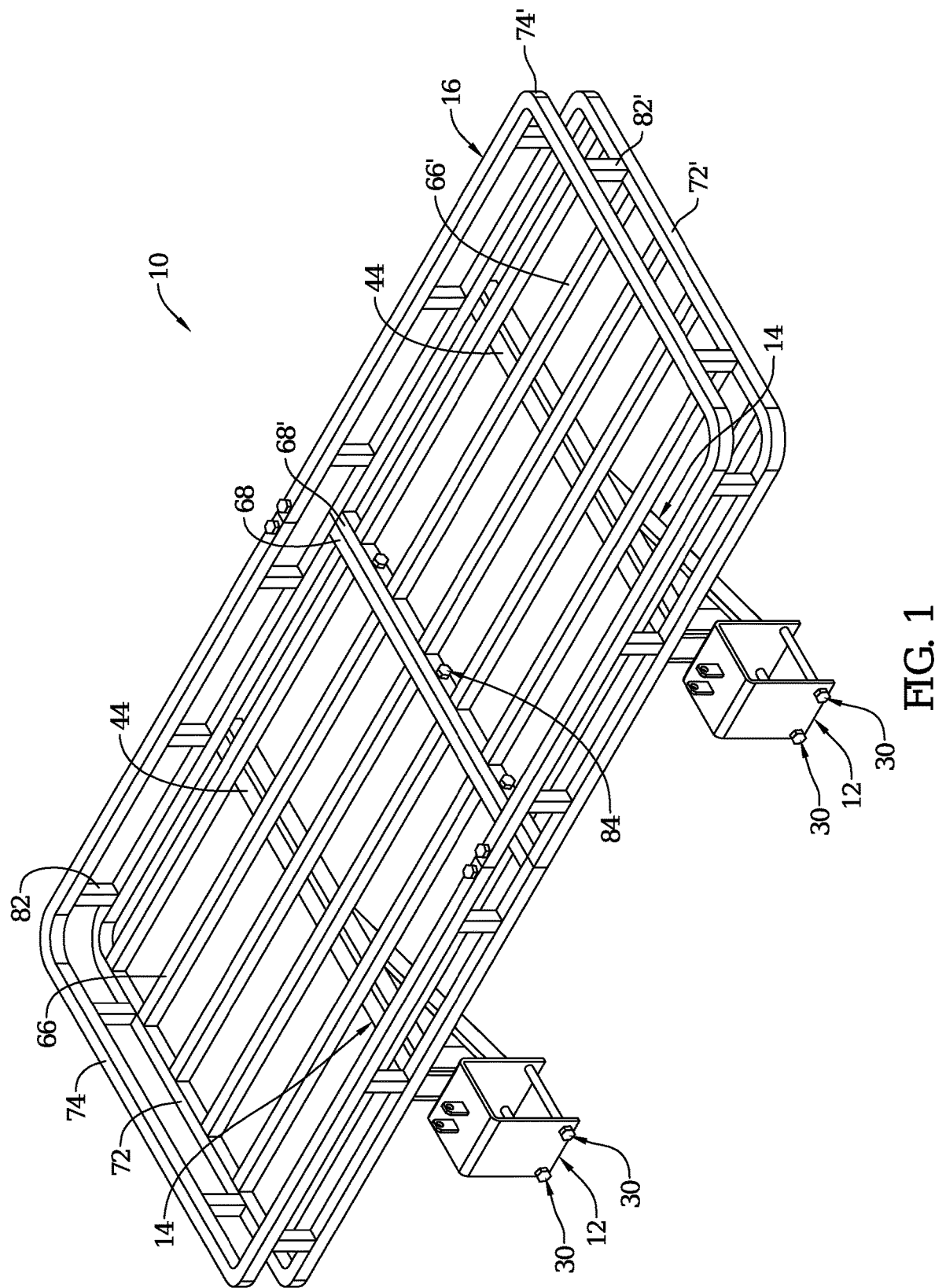
FIG. 1 is a perspective view of the expandable bumper cargo carrying system showing the mounting brackets, the arm assemblies and the cargo basket with the cargo basket in the first or down, horizontally oriented operative position of the cargo basket.
Figure 5:
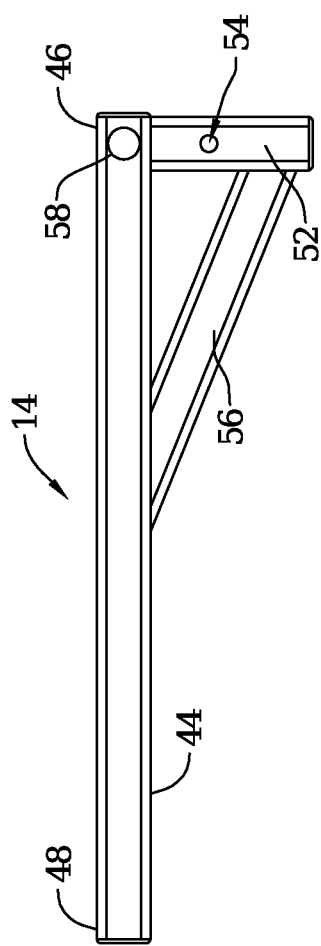
FIG. 5 is a side elevation view of the arm assembly of FIG. 4.
Figure 4:
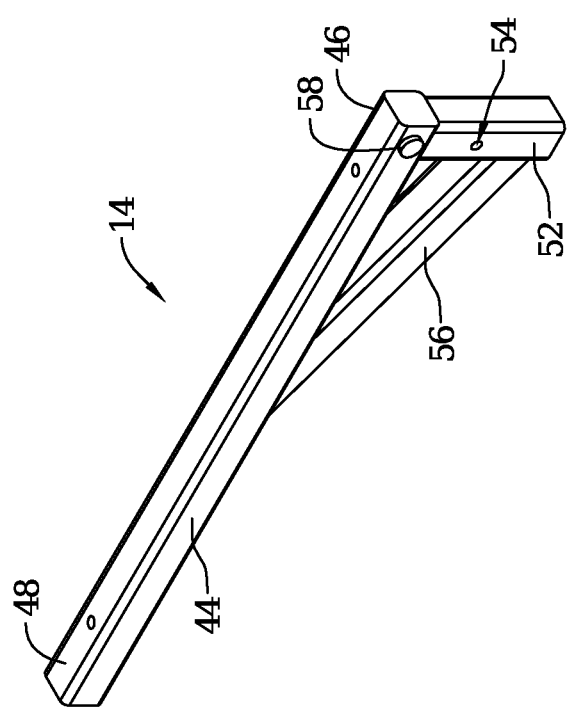
FIG. 4 is a perspective view of one of the pair of arm assemblies.

The following detailed description illustrates the claimed invention by way of example and not by way of limitation. This description will clearly enable one skilled in the art to make and use the claimed invention, and describes several embodiments, adaptations, variations, alternatives and uses of the claimed invention, including what is presently believed to be the best mode of carrying out the claimed invention. Additionally, it is to be understood that the claimed invention is not limited in its application to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

Figure 8:
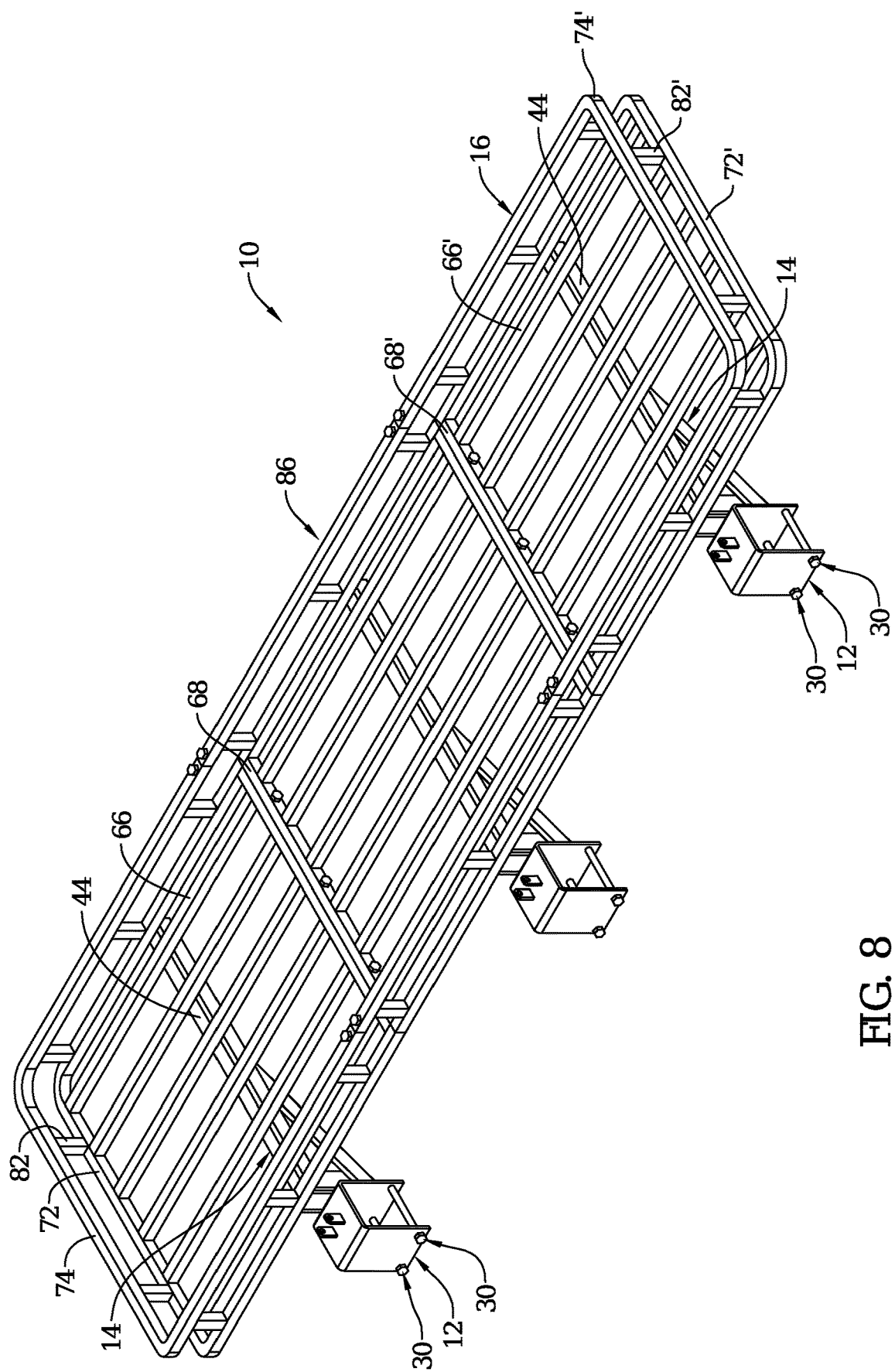
FIG. 8 is a perspective view similar to FIG. 1 of the cargo carrying system with the cargo basket in the first or down, horizontally oriented operative position of the cargo basket, and with the center section of the cargo basket installed with the first side section and second side section of the cargo basket secured to opposite sides of the center section of the cargo basket.

FIG. 1 is a representation of a perspective view of the expandable bumper cargo carrying system 10. The system 10 is basically comprised of a pair of mounting brackets 12, a pair of arm assemblies 14 connected to the mounting brackets 12, and a cargo basket 16 secured to and supported on the pair of arm assemblies 14. FIG. 8 is a representation of a perspective view of the expandable bumper cargo carrying system 10 that also comprises a center section of the cargo basket that increases a length dimension of the cargo basket. The component parts of the system 10 are constructed of a material or materials that provide the system 10 with sufficient structural strength for its intended functioning. For example, the component parts are constructed of a metal, a composite material or other equivalent type of material.

The pair of mounting brackets 12 are removably attachable to a rear bumper of a vehicle. The mounting brackets 12 have same constructions and same configurations. Therefore, only one of the mounting brackets 12 is described herein with reference to FIGS. 1, 2, 3, 11 and 13. The mounting bracket 12 is comprised of a front panel 18, a rear panel 22 and a top panel 24. The top panel 24 extends between and is connected to the front panel 18 and the rear panel 22. The front panel 18, the rear panel 22 and the top panel 24 all have rectangular configurations and are connected integrally as one piece. As represented in FIGS. 2 and 3, the front panel 18, the rear panel 22 and the top panel 24 can be formed from a single strip of material by bending or forming the strip of material into the inverted U-shaped configuration. The front panel 18, the rear panel 22 and the top panel 24 formed in the configuration represented in FIGS. 2 and 3 enables the mounting bracket 12 to be positioned over a rear bumper of a vehicle with the front panel 18 extending over a first surface of the bumper that is directed away from the vehicle, with the rear panel 22 extending over a second surface of the bumper that is directed toward the vehicle and is opposite the first surface of the bumper and with the top panel 24 extending over a top surface of the bumper.

The configuration of the mounting bracket 12 is resiliently flexible. The front panel 18 and the rear panel 22 can be flexed away from each other when positioning the mounting bracket 12 over the bumper. The front panel 18 and the rear panel 22 can flex back toward each other with the front panel 18 engaging against the first surface of the bumper and the rear panel 22 engaging against the second surface of the bumper to attach the mounting bracket 12 to the bumper without making any changes to the construction of the bumper such as drilling fastener holes through the bumper or any other such construction changes.

Fastener holes 26 are provided through the front panel 18 adjacent the bottom edge of the front panel 18. Fastener holes 28 are also provided through the rear panel 22 adjacent to the bottom edge of the rear panel 22. The fastener holes 26 through the front panel 18 and the fastener holes 28 through the rear panel 22 are aligned and coaxial. The fastener holes 26, 28 are dimensioned to receive fasteners 30 such as threaded nut and bolt fasteners or equivalent types of fasteners as represented in FIGS. 1, 8, 11 and 13. Inserting fasteners through the aligned fastener holes 26, 28 and tightening the fasteners will cause the front panel 18 and rear panel 22 to flex toward each other and grip a bumper between the front panel 18 and rear panel 22. Releasing the fasteners will cause the front panel 18 and rear panel 22 to flex away from each other and release the grip on the bumper.

A pair of pivot plates 32 are secured to the front panel 18 of the mounting bracket 12. The pair of pivot plates 32 are horizontally spaced from each other, are parallel to each other and are perpendicular to the front plate 18. The pair of pivot plates 32 extend outward from the front panel 18 and upward from the front panel 18 to top edges of the pivot plates 32 that are spaced vertically above the top panel 24 of the mounting bracket 12.

A pair of pin holes 34 extend through the pivot plates 32 adjacent the bottoms of the pivot plates 32. The pin holes 34 are coaxial. A pair of pivot holes 36 extend through the pivot plates 32 adjacent the top ends of the pivot plates 32. The pivot holes 36 are coaxial and are positioned on the pivot plates 32 above the top panel 24 of the mounting bracket 12.

A pair of lock plates 38 are secured to the top panel 24 of the mounting bracket 12 and extend upward from the top panel 24. The lock plates 38 are horizontally spaced from each other and are parallel.

A pair of lock holes 42 extend through the lock plates 38. The lock holes 42 are coaxial. The lock holes 42 have the same diameter dimensions as the pin holes 34 through the pivot plates 32.

Each of the arm assemblies 14 of the expandable bumper cargo carrying system 10 have same constructions and configurations and therefore only one of the arm assemblies 14 is described herein with reference to FIGS. 1, 4, 5, 11 and 13. The arm assembly 14 is comprised of a support arm 44 that has a straight length between a proximal end 46 of the support arm 44 and a distal end 48 of the support arm 44. The support arm 44 is tubular and has a general rectangular cross section configuration with four flat surfaces surrounding the exterior of the support arm 44. The arm assembly 14 also comprises a contact arm 52 that is secured to the proximal end 46 of the support arm 44. The contact arm 52 is perpendicular to and extends downward from the support arm 44. The contact arm 52 also is tubular and has a general rectangular cross section configuration with four flat surfaces surrounding the exterior of the contact arm 52. The contact arm 52 and the support arm 44 are secured together at a right angle to each other. A pin hole 54 extends through the contact arm 52 below the connection of the contact arm 52 to the support arm 44. A brace arm 56 is secured to and extends between the support arm 44 and the contact arm 52. The brace arm 56 also is tubular and has a general rectangular cross section configuration with four flat surfaces extending around the exterior of the brace arm 56. The brace arm 56 reinforces the right angle connection between the support arm 44 and the contact arm 52. A pivot hole extends through the proximal end 46 of the support arm 44 adjacent the connection between the support arm 44 and the contact arm 52.

A pivot tube 58 extends through the pivot hole. Referring to FIGS. 4, 5, 11 and 13, the pivot tubes 58 of the arm assemblies 14 are positioned between the pivot plates 32 of the mounting brackets 12 with the pivot tubes 58 axially aligned with the pivot holes 36 through the pivot plates 32. Pivot pins 62 are extended through the pivot holes 36 of the pivot plates 32 and the pivot tubes 58 of the arm assemblies 14. The pivot pins 62 mount the arm assemblies 14 to the mounting brackets 12 for pivoting movement of the arm assemblies 14 relative to the mounting brackets 12. The pivot pins 62 enable the arm assemblies 14 and more specifically the support arms 44 to be pivoted between first or down, horizontally oriented operative positions of the arm assemblies 44 relative to the mounting brackets 12 represented in FIGS. 1, 8, 10 and 11, and second or up, vertically oriented stored positions of the support arms 44 relative to the mounting brackets 12 represented in FIGS. 12 and 13.

Figure 6:
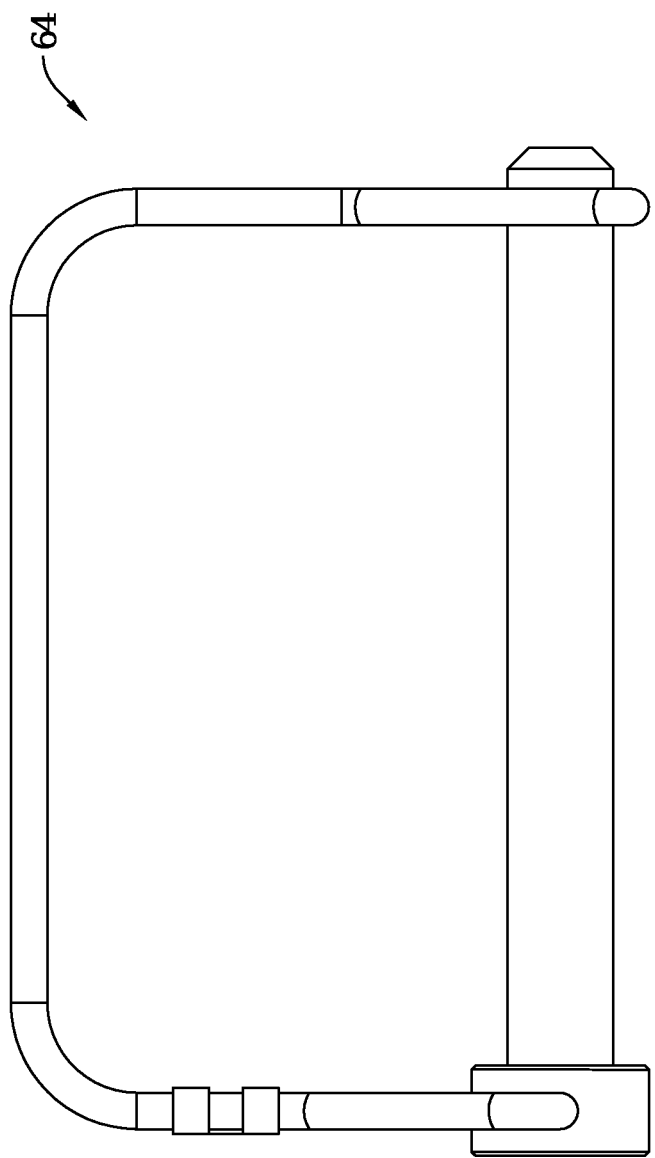
FIG. 6 is a side elevation view of a clevis pin used with the expandable bumper cargo carrying system.
Figure 7:
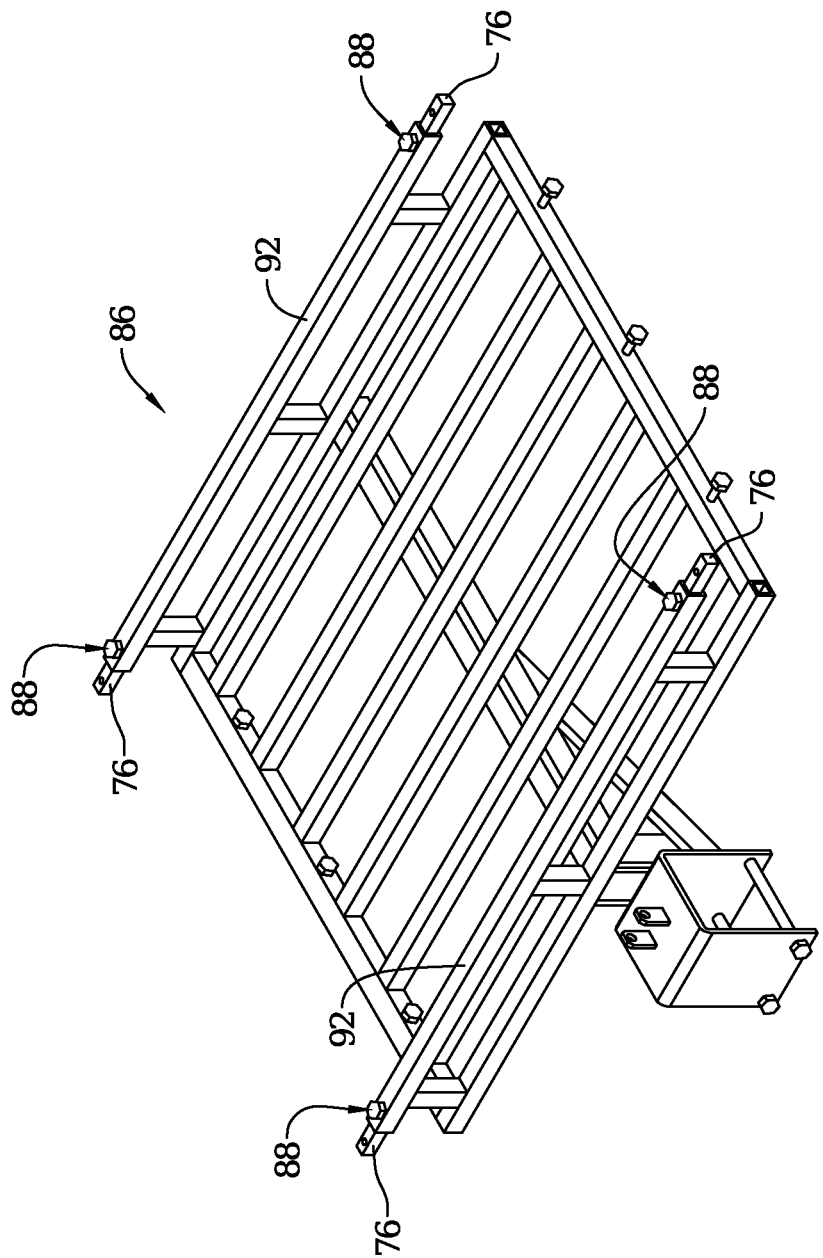
FIG. 7 is a perspective view of a center section of the cargo basket.
Figure 10:
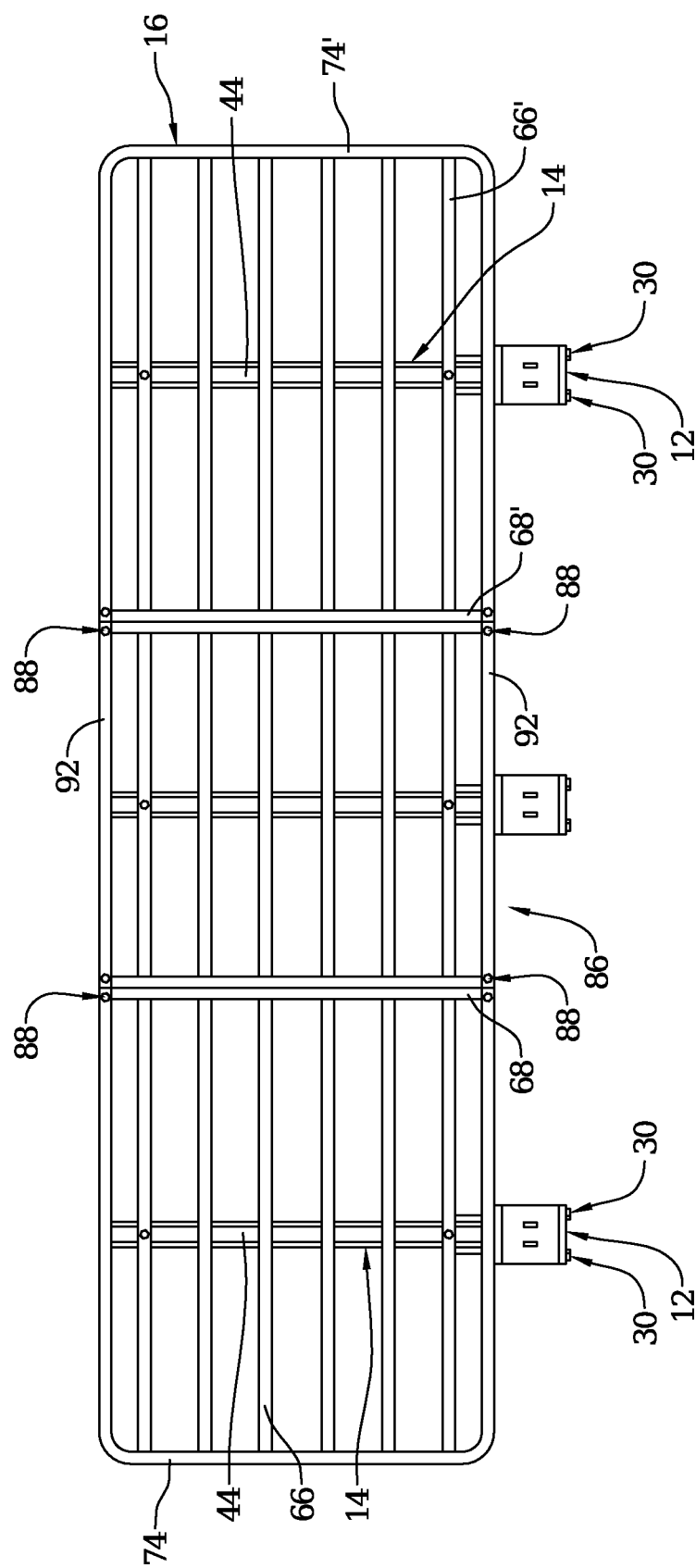
FIG. 10 is a plan view of the cargo carrying system of FIG. 8.
Figure 11:
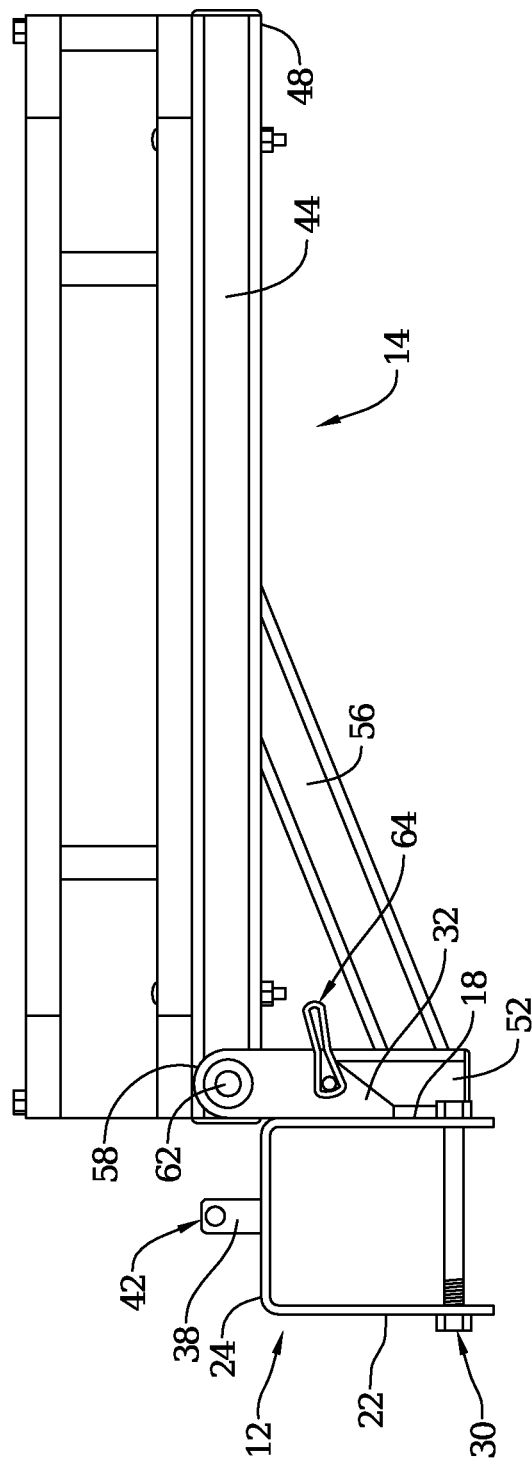
FIG. 11 is a side, elevation view of the cargo carrying system of FIGS. 1 and 8.

With the support arms 44 positioned at the first or down, horizontally oriented operative positions relative to the mounting brackets 12, the contact arms 52 of the arm assemblies 14 engage in surface engagement against the front panels 18 of the mounting brackets 12 as represented in FIGS. 1, 8 and 11. This engagement prevents the support arms 44 from moving further downward relative to the mounting brackets 12. With the support arms 44 positioned in their first or down, horizontally oriented operative positions relative to the mounting brackets 12, pins such as the clevis pin 64 represented in FIG. 6 or another equivalent type of pin can be inserted through the aligned pin holes 54 in the contact arm 52 and the pin holes 34 in the pivot plates 32 to lock the support arms 44 in their first or down, horizontally oriented operative positions relative to the mounting brackets 12 as represented in FIGS. 1, 8, 10 and 11.

The cargo basket 16 is secured by fasteners, welding or other equivalent means on top of the support arms 44 to move with the support arms 44 in the pivoting movements of the support arms 44. As represented in FIGS. 1 and 8, the cargo basket 16 is comprised of a plurality of parallel, longitudinal bars 66, 66' that extend across and are secured to the tops of the support arms 44. The longitudinal bars 66, 66' define a cargo support surface on the top of the cargo basket 16. The cargo support surface has a first side section defined by the longitudinal bars 66 shown to the left in FIGS. 1 and 8, and a second side section defined by the longitudinal bars 66' shown to the right in FIGS. 1 and 8. The longitudinal bars 66, 66' are positioned end to end and extend across and are secured to the tops of the support arms 44. The longitudinal bars 66, 66' have opposing inner ends that are secured to a pair of lateral bars 68, 68' at the center of the cargo basket 16 and at the center of the cargo support surface. The lateral bars 68, 68' separate the longitudinal bars 66, 66' and separate the first side section of the cargo support surface shown to the left in FIGS. 1 and 8 from the second side section of the cargo support surface shown to the right in FIGS. 1 and 8. Each of the longitudinal bars 66, 66' and the lateral bars 68, 68' are tubular and have general rectangular cross section configurations that are surrounded by four flat surfaces that define the outer configurations of the bars.

A bottom peripheral rail 72, 72' is constructed in two halves having general C-shaped configurations that are mirror images of each other and are positioned end-to-end. The bottom peripheral rails 72, 72' extend around and are secured to the outer ends of the longitudinal bars 66, 66' as represented in FIGS. 1 and 8. Opposite ends of the bottom rails 72, 72' are secured to the respective lateral bars 68, 68'. The bottom perimeter rail 72, 72' defines the perimeter of the cargo support surface of the cargo basket 16.

A top perimeter rail 74, 74' extends around the cargo basket 16 above the bottom perimeter rail 72, 72'. The top perimeter rail 74, 74' has a same configuration as the bottom perimeter rail 72, 72' and is positioned directly, vertically above the bottom perimeter rail 72, 72'. Opposite ends of the top perimeter rail 74, 74' are connected together by connecter rods 76 represented in FIG. 9.

Figure 9:
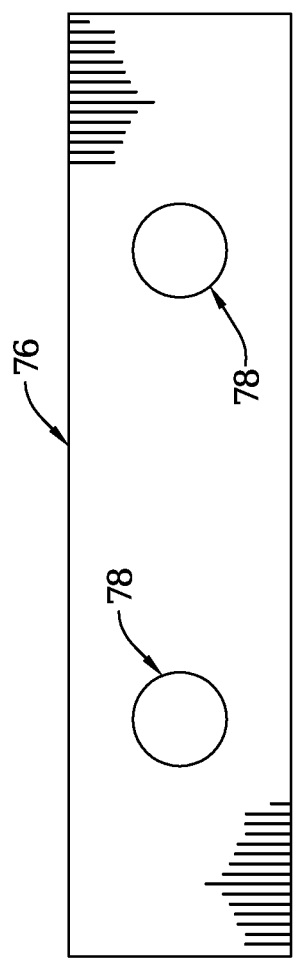
FIG. 9 is a plan view of a connector rod employed in connecting the sections of the cargo basket together.

The connector rod 76 is tubular and has a general rectangular cross section configuration with four flat surfaces that surround the connector rod. A pair of fastener holes 78 extend through the connector rod 76 as represented in FIG. 9. The connector rod 76 is dimensioned to be received inside the interiors of the opposite ends of the sections of the top perimeter rail 74, 72' of the cargo basket 16 that oppose each other when connecting the first section of the cargo basket 16 and the second section of the cargo basket 16 together as represented in FIGS. 1 and 8. With connector rods 76 positioned inside the opposing ends of the top perimeter rail sections 74, 74', fastener holes through the ends of the top perimeter rail sections 74, 74' align with the fastener holes 78 through the connector rods 76. Inserting fastener assemblies through the aligned fastener holes connects the opposite ends of the top perimeter rail sections 74, 74' together using the connector rods 76.

A plurality of vertical posts 82, 82' extend between and are secured between the two halves of the bottom perimeter rail 72, 72' and the two halves of the top perimeter rail 74, 74'. The posts 82, 82' space the top perimeter rail 74, 74' directly vertically above the bottom perimeter rail 72, 72'.

Figure 12:
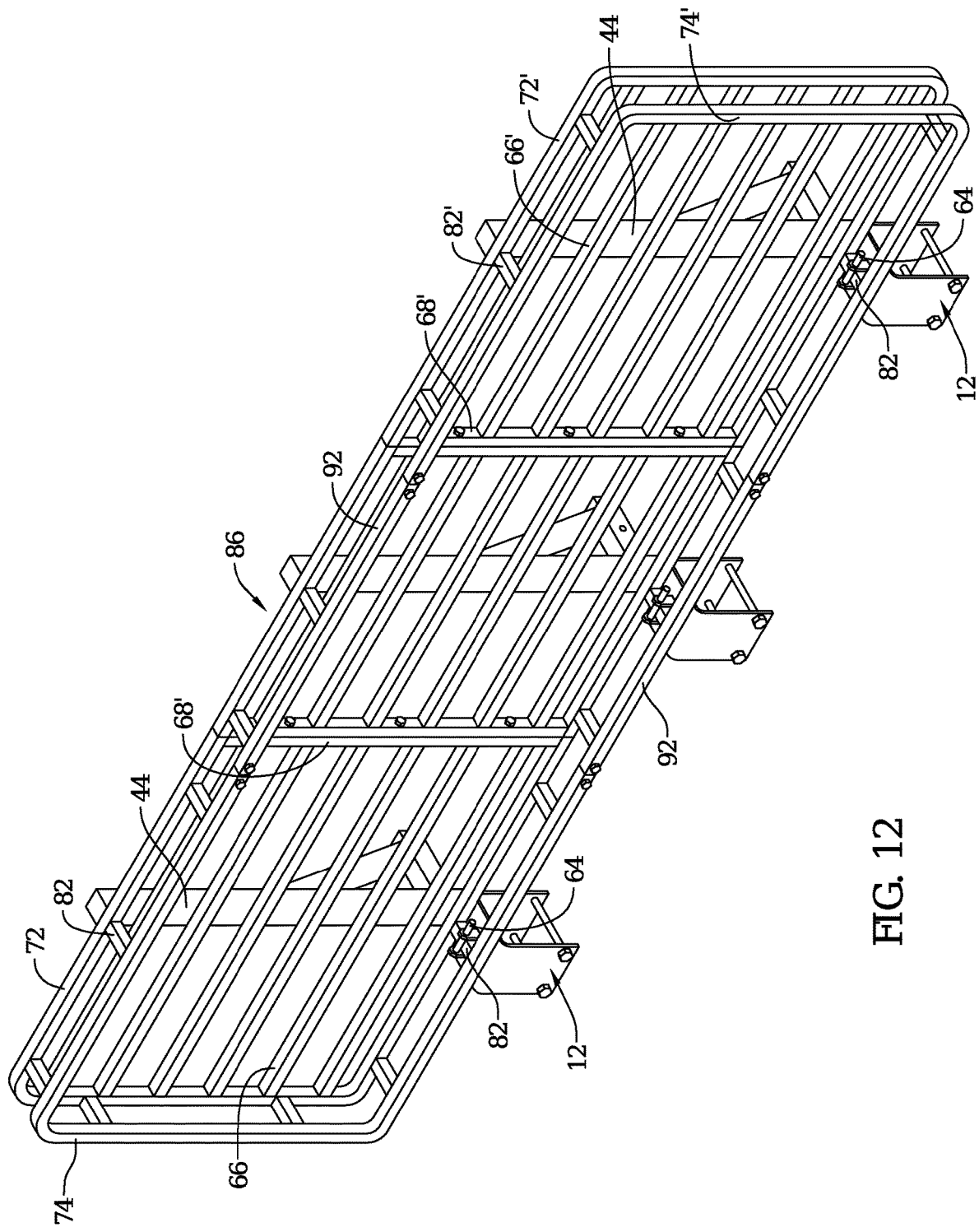
FIG. 12 is a perspective view of the cargo carrying system of FIG. 8 with the cargo basket in the second or up, vertically oriented stored position of the cargo basket.
Figure 13:
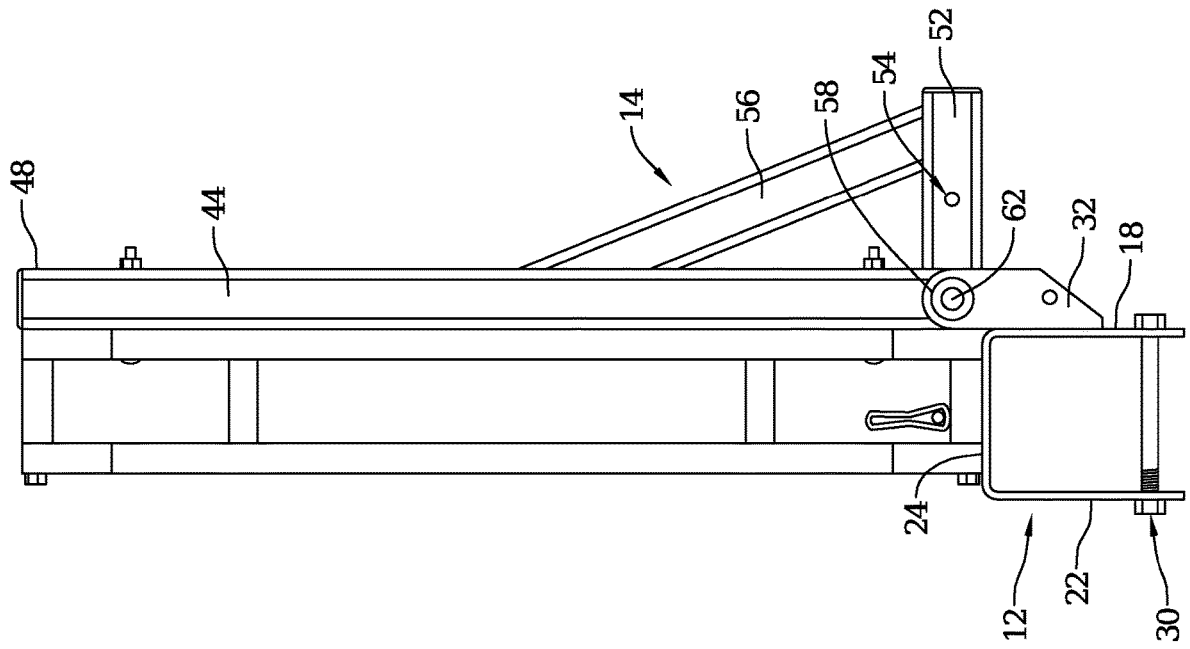
FIG. 13 is a side elevation view of the cargo carrying system of FIGS. 1, 8 and 12 with the cargo basket in the second or up, vertically oriented stored position.

When the arm assemblies 14 are pivoted from the first or down, horizontally oriented operative positions relative to the mounting brackets 12 represented in FIGS. 1, 8, 10 and 11, to the second or up, vertically oriented stored positions relative to the mounting brackets 12 represented in FIGS. 12 and 13, two of the posts 82, 82' of the cargo basket 16 are moved from vertical orientations to horizontal orientations between the pairs of lock plates 38 on the top panels 24 of each of the mounting brackets 12. The post 82, 82' are moved to positions between the lock plates 38 where the posts 82, 82' are below the pin holes 42 through the lock plates 38. At the positions of the horizontally oriented posts 82, 82' below the pin holes 42 through the lock plates 38, a clevis pin 64 or other equivalent type of pin can be inserted through the pin holes 42 in the lock plates 38. This positioning of the clevis pins 64 through the pin holes 42 in the lock plates 38 locks the cargo basket posts 82, 82' in surface engagement against the top panels 24 of the mounting brackets 12 and prevents the posts 82, 82' from being moved upward from their horizontal positions between the lock plates 38. This locks the arm assemblies 14 and the cargo basket 16 in the second or up, vertically oriented stored position relative to the mounting brackets 12. In the second or up, vertically oriented stored position of the cargo basket 16, the cargo basket 16 and the cargo support surface defined by the cargo basket 16 are positioned directly, vertically above the top panels 24 of the mounting brackets 18 and above the mounting brackets 18 as represented in FIGS. 12 and 13. The positioning of the cargo basket 16 directly, vertically above the mounting brackets 12 in the second or up, vertically oriented stored position of the cargo basket 16 makes optimum use of the space available above the vehicle bumper to which the cargo basket 16 is attached by the mounting brackets 12 and avoids the stored cargo basket 16 from extending significantly from the vehicle bumper.

As represented in FIG. 1, the lateral bars 68, 68' of the cargo basket 16 are secured together, side by side, by fastener assemblies 84. The fasteners assemblies thus secure the first side section and the second side section of the cargo basket 16 and the cargo support surface together. By removing the fastener assemblies 84 and the connector rods 76, and removing the cargo basket 16 from the arm assemblies 14, the first side section and the second side section of the cargo basket 16 can be separated from each other and spaced longitudinally from each other. This enables a center section 86 of the cargo basket represented in FIGS. 7, 8, 10 and 12 to be positioned between and connected to the first side section and the second side section of the cargo basket 16. This enables the overall length dimension of the cargo basket 16 to be expanded from the first length dimension of the cargo support surface defined by the cargo basket 16 represented in FIG. 1, to the second length dimension of the cargo support surface defined by the cargo basket 16 represented in FIGS. 8, 10 and 12. As represented in FIGS. 1 and 8, the second length dimension of the cargo basket 16 is larger than the first length dimension of the cargo basket.

The connector rods 76 are also employed in connecting the center section 86 of the cargo basket 16 to the first side section and the second side section of the cargo basket 16 as represented in FIGS. 8, 10 and 12. In the same manner previously described the connector rods 76 are inserted into the opposed ends of the top rails of the center section 86 of the cargo basket and the first side section and second side section of the cargo basket 16. The fastener holes 78 through the connector rods 76 are aligned with fastener holes provided in the opposing ends of the top rails 74, 74' of the first side section and the second side section of the cargo basket 16, and fastener holes 88 through the top rails 92 of the center section 86 of the cargo basket. Fasteners are then inserted through the aligned holes to secure the center section 86 of the cargo basket between the first side section and the second side section of the cargo basket 16 using the connector rods 76.

In view of the above, it will be seen that the several objects and advantages of the present invention have been achieved and other advantageous results have been obtained.

As various changes could be made in the above constructions of the expandable bumper cargo carrying system without departing from the scope of the invention, it is intended that all matter contained in the above description or shown in the accompanying drawings shall be interpreted as illustrative and not in a limiting sense.

The invention claimed is:

1. A cargo carrying system comprising:
    a cargo support surface;
    a mounting bracket that is removably attachable to a bumper of a vehicle, the mounting bracket being comprised of a front panel, a rear panel and a top panel that are integrally formed in a configuration that enables the mounting bracket to be positioned over an exterior configuration of a bumper of a vehicle with the front panel extending over a first surface of the bumper that is directed away from the vehicle, with the rear panel extending over a second surface of the bumper that is opposite the first surface of the bumper and with the top panel extending over a top of the bumper;
    the configuration of the mounting bracket enabling the front panel and the rear panel to flex away from each other when positioning the mounting bracket over the bumper and enabling the front panel and the rear panel to flex toward each other with the front panel engaging against the first surface of the bumper and the rear panel engaging against the second surface of the bumper to thereby attach the mounting bracket to the bumper without making changes to the construction of the bumper;
    the mounting bracket being pivotally connected to the cargo support surface with the cargo support surface being pivotable between first and second positions of the cargo support surface relative to the mounting bracket, where in the first position the cargo support surface is oriented horizontally and in the second position the cargo support service is oriented vertically;
    a pivot plate secured to the front panel of the mounting bracket, the pivot plate being perpendicular to the front panel and extending outward from the front panel, the pivot plate extending upward across the front panel to a top edge of the pivot plate that is spaced vertically above the top panel of the mounting bracket;

a pivot hole through the pivot plate, the pivot hole being positioned on the pivot plate above the top panel of the mounting bracket;

a support arm, the support arm having a length between a proximal end of the support arm and a distal end of a support arm, the cargo support surface being secured on the support arm;

a contact arm secured to the proximal end of the support arm, the contact arm being perpendicular to the support arm and extending downward from the proximal end of the support arm;

a pivot hole through the proximal end of the support arm;

a pivot pin extending through the pivot hole through the pivot plate and through the pivot hole through the proximal end of the support arm, the pivot pin mounting the support arm to the mounting bracket for pivoting movement of the support arm relative to the mounting bracket between a horizontally oriented position of the support arm relative to the mounting bracket where the contact arm engages in surface engagement against the front panel of the mounting bracket and a vertically oriented position of the support arm relative to the mounting bracket.

2. The cargo carrying system of claim 1, further comprising:

a fastener assembly extending between the front panel and the rear panel of the mounting bracket, the fastener assembly being operable to flex the front panel and the rear panel toward each other with the front panel engaging against the first surface of the bumper and the rear panel engaging against the second surface of the bumper to thereby attach the mounting bracket to the bumper without making changes to the construction of the bumper.

3. The cargo carrying system of claim 1, further comprising:

the cargo support surface having a first side section and a second side section, the first side section and the second side section have opposing inner ends that are positioned end-to-end, the first side section and the second side section opposing inner ends are removably attachable together providing the cargo support surface with a first length dimension across the first side section and the second side section;

a center section of the cargo support surface, the center section is removably attachable between the first side section and the second side section providing the cargo support surface with a second length dimension across the first side section, the center section and the second side section; and the second length dimension is larger than the first length dimension.

4. The cargo carrying system of claim 3, further comprising:

the mounting bracket is a first mounting bracket of a pair of first and second mounting brackets, the first and second mounting brackets have same configurations;

the support arm is a first support arm of a pair of first and second support arms, the first and second support arms have same configurations;

the first mounting bracket is pivotally connected to the first support arm and the first side section of the cargo support surface is secured on the first support arm; and the second mounting bracket is pivotally connected to the second support arm and the second side section of the cargo support surface is secured on the second support arm.

5. The cargo carrying system of claim 4, further comprising:

the first mounting bracket and the second mounting bracket are removably attachable to a bumper of a vehicle with the cargo support surface having the first length dimension across the cargo support surface; and the first mounting bracket and the second mounting bracket are removably attachable to a bumper of a vehicle with the cargo support surface having the second length dimension across the cargo support surface.

6. The cargo carrying system of claim 1, further comprising:

in the first position the cargo support surface is oriented horizontally and is positioned extending horizontally from the front panel of the mounting bracket; and in the second position the cargo support surface is oriented vertically and is positioned extending vertically from the top panel of the mounting bracket.

7. The cargo carrying system of claim 6, further comprising:

in the second position the cargo support surface is positioned directly, vertically above the top panel of the mounting bracket.

8. A cargo carrying system comprising:

a mounting bracket, the mounting bracket having a front panel, a rear panel and a top panel, the top panel extending between and being connected to the front panel and the rear panel, the mounting bracket being configured to be positioned over a rear bumper of a vehicle with the front panel being directed away from the vehicle and with the top panel extending over a top of the bumper;

a pivot plate secured to the front panel of the mounting bracket, the pivot plate being perpendicular to the front panel and extending outward from the front panel, the pivot plate extending upward across the front panel to a top edge of the pivot plate that is spaced vertically above the top panel of the mounting bracket;

a pivot hole through the pivot plate, the pivot hole being positioned on the pivot plate above the top panel of the mounting bracket;

a support arm, the support arm having a length between a proximal end of the support arm and a distal end of a support arm;

a contact arm secured to the proximal end of the support arm, the contact arm being perpendicular to the support arm and extending downward from the proximal end of the support arm;

a pivot hole through the proximal end of the support arm;

a pivot pin extending through the pivot hole through the pivot plate and through the pivot hole through the proximal end of the support arm, the pivot pin mounting the support arm to the mounting bracket for pivoting movement of the support arm relative to the mounting bracket between a horizontally oriented position of the support arm relative to the mounting bracket where the contact arm engages in surface engagement against the front panel of the mounting bracket and a vertically oriented position of the support arm relative to the mounting bracket; and a cargo support surface secured to the support arm for pivoting movement of the cargo support surface with pivoting movement of the support arm.

9. The cargo carrying system of claim 8, further comprising:

a post secured to the proximal end of the support arm, the post being perpendicular to the length of the support arm and extending upward in a vertical orientation from the proximal end of the support arm when the support arm is oriented horizontally, and when the support arm is moved in a pivoting movement relative to the mounting bracket to the vertically oriented position of the support arm relative to the mounting bracket the post is moved in a pivoting movement relative to the mounting bracket and extends in a horizontal orientation from the proximal end of the support arm over the top panel of the mounting bracket.

10. The cargo carrying system of claim 9, further comprising:
a cargo basket is secured to the support arm to move with the support arm in pivoting movements of the support arm relative to the mounting bracket; the cargo basket is comprised of a plurality of parallel bars that extend across and are secured to the support arm, the plurality of parallel bars define the cargo support surface.

11. The cargo carrying system of claim 10, further comprising:
a bottom peripheral rail extends around and is secured to the plurality of parallel bars;
a top peripheral rail extends around the bottom peripheral rail; and
the post is one post of a plurality of posts that are secured between the bottom peripheral rail and the top peripheral rail.

12. The cargo carrying system of claim 9, further comprising:
a pair of lock plates are secured to the top panel of the mounting bracket and extend upward from the top panel, the pair of lock plates are horizontally spaced from each other and are parallel to each other;
a pair of lock holes extend through the pair of lock plates, the pair of lock holes are coaxial; and
when the support arm is in the second, vertically oriented position of the support arm relative to the mounting bracket the post secured to the proximal end of the support arm is positioned between the pair of lock plates and below the pair of lock holes extending through the pair of lock plates enabling a pin to be inserted through the pair of lock holes through the pair of lock plates with the pin extending over the post.

13. The cargo carrying system of claim 8, further comprising:
the cargo support surface having a first side section and a second side section that are removably attachable together providing the cargo support surface with a first length dimension across the first side section and the second side section;
a center section of the cargo support surface, the center section being removably attachable between the first side section and the second side section providing the cargo support surface with a second length dimension across the first side section, the center section and the second side section; and
the second length dimension being larger than the first length dimension.

14. The cargo carrying system of claim 13, further comprising
the mounting bracket is a first mounting bracket of a pair of first and second mounting brackets, the first and second mounting brackets have same configurations;
the first mounting bracket is pivotally connected to the first side section of the cargo support surface; and
the second mounting bracket is pivotally connected to the second side section of the cargo support surface.

15. A cargo carrying system comprising:
a mounting bracket comprising a front panel and a top panel, the front panel and the top panel being formed in a configuration that enables the front panel to be positioned over a rear bumper of a vehicle with the front panel extending over a surface of the rear bumper that is directed away from the vehicle and with the top panel extending over a top surface of the rear bumper;
a pair of pivot plates secured to the front panel of the mounting bracket, the pair of pivot plates are horizontally spaced from each other, are parallel to each other and are perpendicular to the front panel, the pair of pivot plates extend outward from the front panel and upward across the front panel to top edges of the pivot plates that are spaced vertically above the top panel of the mounting bracket;
a pair of pivot holes extend through the pair of pivot plates, the pair of pivot holes are positioned on the pair of pivot plates spaced vertically above the top panel of the mounting bracket;
a support arm, the support arm having a length between a proximal end of the support arm and a distal end of the support arm;
a contact arm, the contact arm being connected to the proximal end of the support arm, the contact arm being positioned perpendicular to the support arm and extending downward from the proximal end of the support arm;
a pivot hole extending through the proximal end of the support arm, the pivot hole extending through the proximal end of the support arm being positioned between the pair of pivot plates on the mounting bracket with the pivot hole extending through the proximal end of the support arm being axially aligned with the pair of pivot holes through the pair of pivot plates;
a cargo support surface, the cargo supports surface being secured on the support arm;
a post, the post being secured to the cargo support surface, the post being positioned perpendicular to the support arm and extending upward from the proximal end of the support arm; and
a pivot pin extending through the pair of pivot holes through the pair of pivot plates and through the pivot hole through the proximal end of the support arm, the pivot pin mounting the support arm to the mounting bracket for pivoting movement of the support arm relative to the mounting bracket, the pivot pin enabling the support arm to be pivoted between a first, horizontally oriented position of the support arm relative to the mounting bracket where the contact arm engages in surface engagement against the front panel of the mounting bracket and a second, vertically oriented position of the support arm relative to the mounting bracket where the post is moved to a horizontal orientation over the top panel of the mounting bracket.

16. The cargo carrying system of claim 15, further comprising:
a pair of pin holes extend through the pair of pivot plates, the pair of pin holes are coaxial;
a pin hole extends through the contact arm below the connection of the contact arm to the proximal end of the support arm; and
when the support arm is in the first, horizontally oriented position of the support arm relative to the mounting bracket, the contact arm is positioned between the pair of pivot plates and the pair of pin holes through the pair of pivot plates align with the pin hole through the contact arm enabling a pin to be inserted through the pair of pin holes through the pair of the pivot plates and through the pin hole through the contact arm.

17. The cargo carrying system of claim 15, further comprising:
a pair of lock plates are secured to the top panel of the mounting bracket and extend upward from the top panel, the pair of lock plates are horizontally spaced from each other and are parallel to each other;
a pair of lock holes extend through the pair of lock plates, the pair of lock holes are coaxial; and
when the support arm is in the second, vertically oriented position of the support arm relative to the mounting bracket, the post secured to the cargo support surface is positioned between the pair of lock plates and below the pair of lock holes extending through the pair of lock plates enabling a pin to be inserted through the pair of lock holes through the pair of lock plates with the pin extending over the post.

18. The cargo carrying system of claim 15, further comprising:
the cargo support surface having a first side section and a second side section that are removably attachable together providing the cargo support surface with a first length dimension across the first side section and the second side section;
a center section of the cargo support surface, the center section being removably attachable between the first side section and the second side section providing the cargo support surface with a second length dimension across the first side section, the center section and the second side section; and
the second length dimension is larger than the first length dimension.

19. The cargo carrying system of claim 18, further comprising:
the mounting bracket is a first mounting bracket of a pair of first and second mounting brackets, the first and second mounting brackets have same configurations;
the first mounting bracket is pivotally connected to the first side section of the cargo support surface; and
the second mounting bracket is pivotally connected to the second side section of the cargo support surface.

20. The cargo carrying system of claim 15, further comprising:
a cargo basket is secured to the support arm to move with the support arm in pivoting movements of the support arm relative to the mounting bracket, the cargo basket is comprised of a plurality of parallel bars that extend across and are secured to the support arm, the plurality of parallel bars define the cargo support surface.

* * * * *